United States Patent [19]

Metzler, Jr.

[11] Patent Number: 4,794,957

[45] Date of Patent: Jan. 3, 1989

[54] BENDING STRAIN RELIEF FOR HOSE BUNDLE

[75] Inventor: Allan R. Metzler, Jr., Houston, Tex.

[73] Assignee: PMI Industries, Inc., Cleveland, Ohio

[21] Appl. No.: 17,070

[22] Filed: Feb. 20, 1987

[51] Int. Cl.$^4$ .............................................. F16L 11/00
[52] U.S. Cl. ........................................ 138/109; 403/41
[58] Field of Search ............... 138/96 R, 109, 110, 138/132, 133; 174/19; 285/45, 114, 115, 256; 403/41

[56] References Cited

U.S. PATENT DOCUMENTS

| | | | |
|---|---|---|---|
| 1,367,246 | 2/1921 | Ewald | 138/110 X |
| 2,236,731 | 4/1941 | Oberly | 138/133 X |
| 3,529,632 | 9/1970 | Johns | 138/111 |

*Primary Examiner*—Mark J. Thronson
*Attorney, Agent, or Firm*—Fay, Sharpe, Beall, Fagan, Minnich & McKee

[57] ABSTRACT

A bending strain relief includes a generally transparent, flexible member for receipt over a hose assembly. An opening extends longitudinally through the strain relief having a cross-sectional dimension greater than the cross-sectional dimension of the hose assembly. The cross-sectional dimension is also designed for interference fit with a swaged region or coupling end of the hose assembly. A stiffener member having a generally helical conformation extends from an outer end of the bending strain relief toward an inner end thereof. A first region of the bending strain relief encapsulates the stiffener member therein, and a second region is void of any stiffener member. The longitudinal opening of the bending strain relief is preferably non-circular and is designed to provide an interference fit with a coupling nut to hold the bending strain relief in place.

3 Claims, 1 Drawing Sheet

U.S. Patent  Jan. 3, 1989  4,794,957
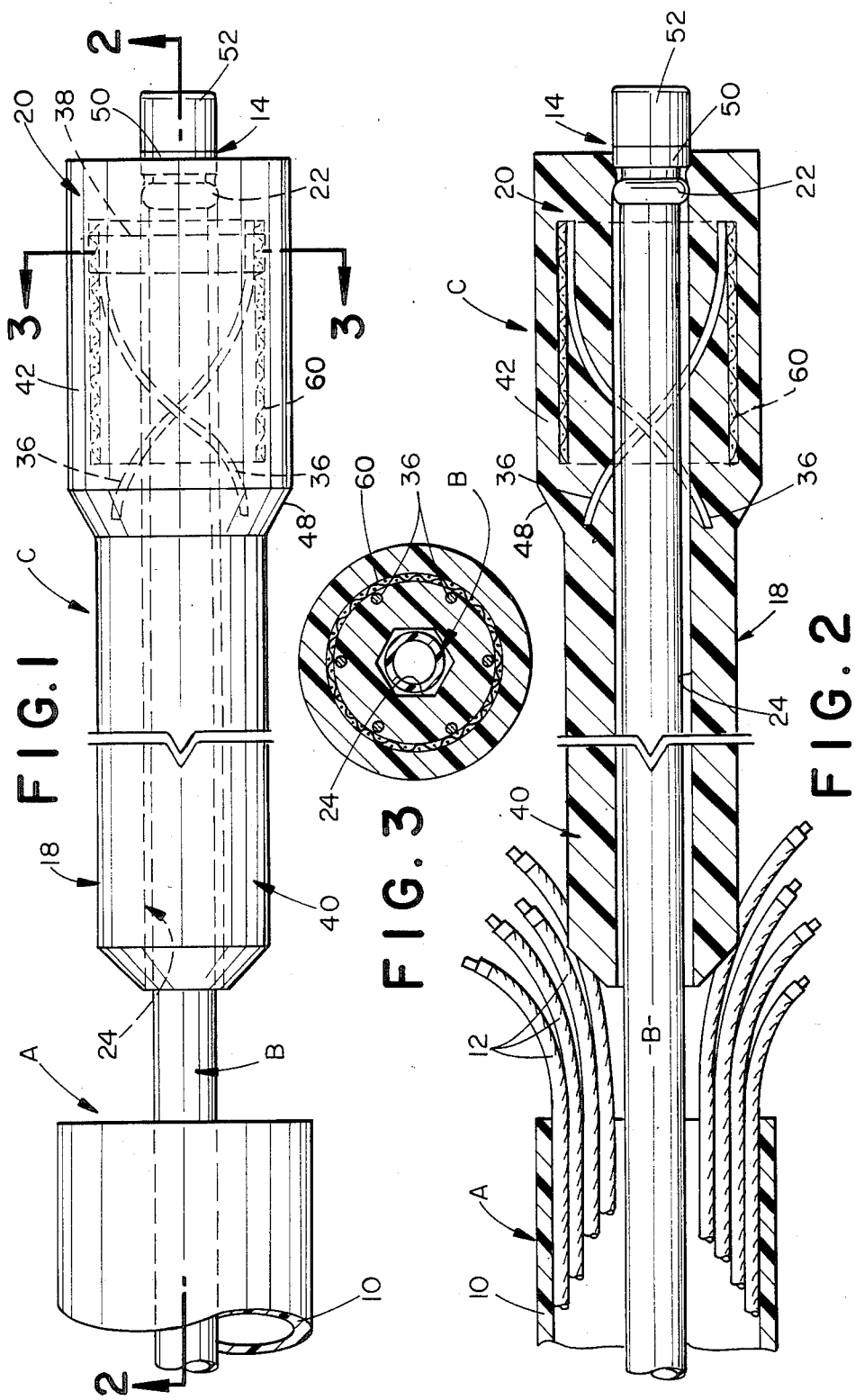

BENDING STRAIN RELIEF FOR HOSE BUNDLE

BACKGROUND OF THE INVENTION

This invention pertains to the art of strain reliefs and, more particularly, to bending strain reliefs for cable or hose.

The invention is particularly applicable to protecting the central hose of an oil field blow-out preventer control umbilical at the blow-out preventer stack termination and will be described with particular reference thereto. However, it will be appreciated that the invention has broader applications and may be advantageously employed in other environments requiring limitation of flexural fatigue and kinking of a cable or hose-type structure.

Bending strain relief assemblies are commonly applied to terminal end portions or couplings of a cable, hose assembly, or the like when these structures are to be subjected to kinking during handling and operation. In an effort to alleviate the forces and stresses imposed on the hose assembly, current arrangements utilize a split hose having a dimension one size larger than the hose assembly to be protected. This difference in dimension allows the split hose to be wrapped over the kink area or area of potential flexural fatigue.

Yet another solution employs a reinforced rubber boot designed to contain an internal burst pressure. By virtue of its surrounding relation at the hose assembly fitting, and due to its minimum stiffness, the boot is indirectly used to address the kinking problem with only marginal results. Since the reinforced rubber boot is not designed to specifically alleviate the flexural fatigue and kinking problems associated with the hose assembly, it has not proved wholey satisfactory.

Another problem associated with these devices is the need to position the makeshift bending strain reliefs on the hose assembly prior to termination. This adds unnecessary structure and complexity to the hose assembly during termination or coupling.

The present invention meets the foregoing needs and eliminates problems encountered with prior art structures to provide an assembly which is simple, effective, reliable, and adapted to use in a wide variety of applications and environments.

SUMMARY OF THE INVENTION

The present invention is directed to a reinforcing apparatus including a flexible member having an opening extending therethrough and a stiffener member associated therewith.

According to one aspect of the invention, the flexible member includes two distinct regions. A first region is adapted to receive a stiffener member and a second region is void of any stiffener member.

According to another aspect of the invention, the opening in the flexible member has a non-circular conformation adapted to facilitate an interference fit with an associated hose assembly.

In accordance with a further aspect of the invention, the stiffener member has a generally helical conformation designed to provide variable stiffness along the length of the flexible member.

In accordance with still another aspect of the invention, the flexible member is formed of a generally transparent material to facilitate visual inspection of the hose assembly.

A principal advantage of the invention is found in the ability to protect hose assemblies from flexural fatigue and kinking at a termination or coupling.

Yet another advantage of the invention resides in the elimination of machined metal adapters for accommodating the bending strain relief structure to a hose assembly.

A still further advantage of the invention is the ability to apply the strain relief assembly after termination of the hose assembly.

Still other advantages and benefits of the invention will become apparent to those skilled in the art upon a reading and understanding of the following detailed description.

BRIEF DESCRIPTION OF THE DRAWINGS

The invention may take physical form in certain parts and arrangements of parts, a preferred embodiment of which will be described in detail in this specification and illustrated in the accompanying drawings which form a part hereof, and wherein:

FIG. 1 is a side elevational view of the subject invention providing strain relief for a hose assembly;

FIG. 2 is a longitudinal, cross-sectional view taken along the lines 2—2 of FIG. 1; and, FIG. 3 is a cross-sectional view taken along the lines 3—3 of FIG. 2.

DETAILED DESCRIPTION OF THE PREFERRED EMBODIMENT

Referring now to the drawings wherein the showings are for purposes of illustrating the preferred embodiment of the invention only and not for purposes of limiting same, the FIGURES show a hose bundle assembly A having a central hose B that has been terminated or prepared for coupling arrangement. A bending strain relief or reinforcing apparatus C has an annular or sleeve-like conformation and is designed for application preferably after termination of the hose assembly.

More particularly, the hose bundle assembly A includes an outer sheath 10 disposed in circumferential, surrounding relation to a plurality of control cables 12 (FIG. 2) that monitor the various functions of an oil field blow-out preventer. For example, temperature and pressure readings are critical parameters that are continually monitored through the control cables. The central hose B is the element most subject to kinking and flexural fatigue during handling and operation. In an effort to alleviate the detrimental effects caused by kinking, flexure, and the like, the outer sheath 10 is terminated a preselected distance from a hose assembly termination point 14 to expose the control cables and central hose. The central hose and contol cables can then be prepared for termination or coupling.

A first or inner end 18 of the bending strain relief is designed for free sliding engagement over the central hose for operative receipt thereon. The strain relief C is thereby radially interposed between the control cables 12 and central hose B. A second or outer end 20 of the bending strain relief is designed for an interference or friction fit with a swaged area 22 or coupling at the outer terminal end of the hose bundle assembly as will be described further hereinbelow. Longitudinal opening 24 extends from the inner end to the outer end of the bending strain relief and is typically of constant dimension. The opening has a predetermined dimension substantially greater than the outside dimension or diameter of the central hose B to permit sliding fit thereover and define a generally annular space therewith.

The opening 24 is designed to closely receive the swaged area 22 defined on the outer axial end of the central hose. The swaged area has a peripheral dimension sufficiently greater than the opening dimension to achieve a close fitting relationship therewith. In this manner, the bending strain relief may be passed axially over the swaged area to securely engage the swaged area. Such a relationship is achieved through the deformable nature of the preferred material from which bending strain relief C is manufactured.

In particular, bending strain relief C is a molded structure of deformable and flexible material such as urethane. Of course, it is readily understood that other materials having the same or similar characteristics may be used with equal success without departing from the scope and intent of the subject invention. As illustrated, the bending strain relief is also generally transparent so that once installed, it readily provides a visual indication of the integrity of the hose and coupling encased therein. It is, of couse, understood that the strain relief can be opaque without departing from the scope of the subject invention.

Due to the flexibility of the urethane structure, one or more stiffener members 36 are embedded in the strain relief to enhance and vary the flexural strength. More specifically, each stiffener member 36 has a generally helical conformation and is molded directly into the urethane body so that the stiffener member is totally encapsulated. As is apparent from both of FIGS. 1 and 2, the stiffener members extend from the outer end 20 toward the inner end 18 of the bending strain relief. This, in turn, provides a variable stiffness along the length of the bending strain relief that cannot be achieved through use of the flexible, urethane member alone.

The stiffener member is maintained in position during set-up in the mold through use of a urethane annulus or donut 38. This donut is shown in phantom in the FIGURES so as to indicate that it becomes at least substantially integral with the flexible strain at the time of molding. In a preferred embodiment, the donut permits one end of the stiffener member to be maintained at a greater diameter than the other end to provide a radially inward tapering conformation as the stiffener member extends axially from the outer end 20 toward the inner end 18 of the bending strain relief. The precise positioning of the stiffener member and the radially inward taper can be closely controlled through use of the urethane donut 38.

The first end 18 of the strain relief includes a region 40 that is void of any reinforcement or stiffener members 36. This stiffener void region extends longitudinally from the terminus of the first end, and may be tailored to any desired length of protection deemed necessary. The stiffener-void region 40 also has an external or peripheral dimension that is sufficiently small so that the first region offers only limited fatigue relief.

A second or stiffener region 42 extends axially inward from the second end 20. The stiffener members 36 are received in the stiffener region 42 to protect the central hose B from fatigue and kinking. In one preferred arrangement, the stiffener void region comprises approximately two-thirds of the longitudinal dimension of the strain relief and the stiffener members about one-third of the overall length. Of course, other ratios of the reinforced or stiffener regions 42 to stiffener void region can be used as required by specific applications.

The outer end 20 of the bending strain relief has an external diameter greater than that of the inner end 18. This relationship accommodates the stiffener members, as well as adding further bulk to the structure adjacent its terminal end. As illustrated, a first merging area 48 interconnects the enlarged peripheral region of the outer end 20 with the smaller external periphery of the inner end 18. Other configurations can also be used with equal success without departing from the scope and intent of the subject invention. In the preferred arrangement, the stiffener members do not extend axially beyond the merging area 48. If desired, or necessary for selected applications, the stiffener members could extend into the smaller external peripheral region adjacent the first end.

As briefly indicated above, the outer sheath 10 is removed from the hose bundle assembly. The control cables 12, as well as the central hose B, are prepared for termination or coupling. The inner end 18 of the bending strain relief is received over the swaged area 22 and the central hose. The stiffener void region at the inner end is thin-walled and sufficiently flexible to slide over the swaged area with minimal effort. An increase in the insertion force is required as the stiffener region 42 adjacent the outer end 20 is received over the swaged area.

The opening 24 preferably has a non-circular conformation, such as a generally hexagonal-shape (FIG. 3), at least along a predetermined length thereof which is designed to provide close locking engagement with the swaged area 22. The generally circular periphery of the swaged area engages the flat regions of the hex-shape opening to assure a secure, interference fit or engagement between the strain relief and the central bore. The interference fit maintains locking engagement of the bending strain relief both axially and rotationally relative to the central bore.

A similarly shaped coupling nut 50 and lock nut 52 are disposed on the central hose B. Although only nut 50 is shown as being received in the hex-shaped opening 24 of the strain relief, it will be apparent to one skilled in the art that nut 52 can also be received therein. The mating receipt of the hex-shaped nuts in the hex-shaped opening limits rotational and, in turn, axial movement of the nuts.

According to the benefits offered by the subject invention, the bending strain relief may be installed on hose assemblies without prior placement thereon before termination. The dimensional relationships facilitate free sliding movement of the strain relief over the swaged area until an interference fit is established between the strain relief and the swaged area or coupling nut and locking nut. Use of one or more helical stiffener rods 36 offers a variable stiffness to the structure that corresponds with the areas of the hose assembly subject to the greatest potential for flexure fatigue or kinking.

Still further, different size stiffener rods permit variations in the stiffness of the structure. Alternatively, rods disposed at different radial dimension or layers, as well as varying axial dimensions of plural rods, will also achieve a varying stiffness over the longitudinal length of the stain relief.

Yet another alternative embodiment utilizes a mesh reinforcement means or member 60 to be used in combination with the stiffener rods or used alone without any stiffener rods. If used in combination with he stiffener rods, the mesh reinforcement means is preferably disposed radially inward of the rods. Of course, other applications may dictate that the mesh reinforcement means be disposed radially outward of the stiffener rods. The mesh reinforcement means can be constructed of various materials such as metal, fabrics, plastics, and the like that will facilitate containment of an internal burst pressure.

The invention has been described with reference to the preferred embodiment. Obviously, modifications and alterations will occur to others upon a reading and understanding of this specification. It is intended to include all such modifications and alterations insofar as they come within the scope of the appended claims or the equivalents thereof.

Having thus described the invention, it is now claimed:

1. In combination, a cable structure having a generally constant first diametrical dimension along its axial length and an enlarged diametrical dimension coupling area at an outer terminal end and an apparatus for limiting flexural fatigue and kinking of said cable structure, said apparatus comprising:

an elongated flexible member having a central opening extending between first and second ends, said opening having a constant, predetermined diametrical dimension greater than the first diametrical dimension and less than the enlarged diametrical dimension of the cable structure to define a generally annular space with the cable structure along the first diametrical dimension and a secure interference engagement with the coupling area; and, means for reinforcing said flexible member along a generally axial dimension thereof, said reinforcing means encapsulated within said flexible member and extending partially along said flexible member axial dimension for varying the flexural strength thereof.

2. The combination as defined in claim 1 wherein said flexible member includes a first region void of any reinforcing means and extending approximately two-thirds the axial dimension from said first end, and said reinforcing means encapsulated in a second region extending the remaining approximate one-third of the axial dimension from the second end.

3. The combination as defined in claim 2 wherein said first region has a cross-sectional dimension which is less than the cross-sectional dimension of said second region.

4. The combination as defined in claim 1 wherein said opening has a non-circular, cross-sectional conformation.

5. The combination as defined in claim 1 wherein said reinforcing means includes a plurality of helical stiffener rods.

6. The combination as defined in claim 1 wherein said reinforcing means includes a mesh member.

7. In combination, a cable structure having a generally constant first diametrical dimension along its axial length and an enlarged diametrical dimension coupling area at an outer terminal end and an apparatus for limiting flexural fatigue and kinking of said cable structure, said apparatus comprising:

an elongated flexible member having a central opening of generally constant diametrical dimension extending from a first end to a second end, said central opening diametrical dimension being substantially greater than the cable structure first diametrical dimension to define an annular space therebetween and being slightly less than the cable structure enlarged diametrical dimension to define an interference fit with the coupling area, said first end of the flexible member void of any stiffener rods to enhance flexibility thereof and facilitate sliding receipt over the terminal end coupling area, said second end of the flexible member having a greater cross-sectional dimension than the first end and including helical stiffener rods encapsulated therein to provide increased resistance to flexing and insure an interference fit between the second end and the coupling area of the cable structure.

8. The combination as defined in claim 7 wherein said first end defines approximately two-thirds of the total axial dimension of the apparatus and the second end defines the remaining one-third of the total axial dimension.

9. The combination as defined in claim 7 wherein said opening has a non-circular, cross-sectional conformation.

10. The combination as defined in claim 7 further comprising a mesh member.

* * * * *